US010699364B2

(12) United States Patent
Suresh

(10) Patent No.: US 10,699,364 B2
(45) Date of Patent: Jun. 30, 2020

(54) GRAPHICAL RENDERING USING MULTIPLE GRAPHICS PROCESSORS

(71) Applicant: Citrix Systems, Inc., Fort Lauderdale, FL (US)

(72) Inventor: Ashwin Suresh, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 15/647,626

(22) Filed: Jul. 12, 2017

(65) Prior Publication Data
US 2019/0019267 A1     Jan. 17, 2019

(51) Int. Cl.
*G06T 1/20* (2006.01)
*G06F 9/50* (2006.01)
*G06T 15/00* (2011.01)

(52) U.S. Cl.
CPC .............. *G06T 1/20* (2013.01); *G06F 9/5044* (2013.01); *G06F 9/5066* (2013.01); *G06F 9/5077* (2013.01); *G06T 15/005* (2013.01); *G06T 2210/52* (2013.01)

(58) Field of Classification Search
None
See application file for complete search history.

(56) References Cited

U.S. PATENT DOCUMENTS 7,659,897 B1 *  2/2010  Azar .................... G06F 11/3428
                                                             345/501
8,941,669 B1     1/2015  Moreton

| 2010/0110083 | A1* | 5/2010 | Paltashev | ............ | G06F 9/30072 |
| | | | | | 345/506 |
| 2012/0254439 | A1* | 10/2012 | Yamasaki | ............... | G06F 9/505 |
| | | | | | 709/226 |
| 2013/0268573 | A1* | 10/2013 | Lee | ................... | H04L 29/08135 |
| | | | | | 709/201 |
| 2017/0132747 | A1* | 5/2017 | Wilt | ......................... | G06T 1/20 |

(Continued)

FOREIGN PATENT DOCUMENTS

WO     2017083781 A1     5/2017

OTHER PUBLICATIONS

"SLI & Crossfire in the Same PC!," YouTube, Linus Tech Tips, Published Feb. 6, 2014, accesssed from https://www.youtube.com/watch?v=Yqkl7bOfRkA.

(Continued)

*Primary Examiner* — Steven Z Elbinger
(74) *Attorney, Agent, or Firm* — Banner & Witcoff, Ltd.

(57) ABSTRACT

Aspects described herein are directed to leveraging multiple graphics processors, by a virtual GPU manager, to optimize the rendering of graphics in either a desktop or virtual desktop environment. The virtual GPU manager may enumerate all available physical GPUs, query performance variables including processing capacity of each of the available physical GPUs, and classify each of the physical GPUs based on the queried performance variables. Further, the virtual GPU manager may generate a logical GPU corresponding to one or more of the available physical GPUs. The virtual GPU manager may distribute graphics rendering requests across each of the plurality of available physical GPUs by way of the logical GPU.

20 Claims, 13 Drawing Sheets

(56) References Cited

U.S. PATENT DOCUMENTS

2018/0204301 A1* 7/2018 Featonby .................. G06T 1/20
2018/0284872 A1* 10/2018 Schluessler ........... G06F 1/3218

OTHER PUBLICATIONS

Zhao, Xingfang et al., "Multitask Oriented GPU Resource Sharing and Virtualization in Cloud Environment," College of Computer Science and Technology, Nanjing University of Aeronautics and Astronautics, Dec. 16, 2015, 16 Pages.
Elliott, Glenn A., "Supporting Real-Time Computer Vision Workloads Using OpenVX on Multicore+GPU Platforms," Department of Computer Science, University of North Carolina at Chapel Hill, 2015, 12 Pages.
Oct. 18, 2018—International Search Report and Written Opinion—App PCT/US18/040867.

* cited by examiner

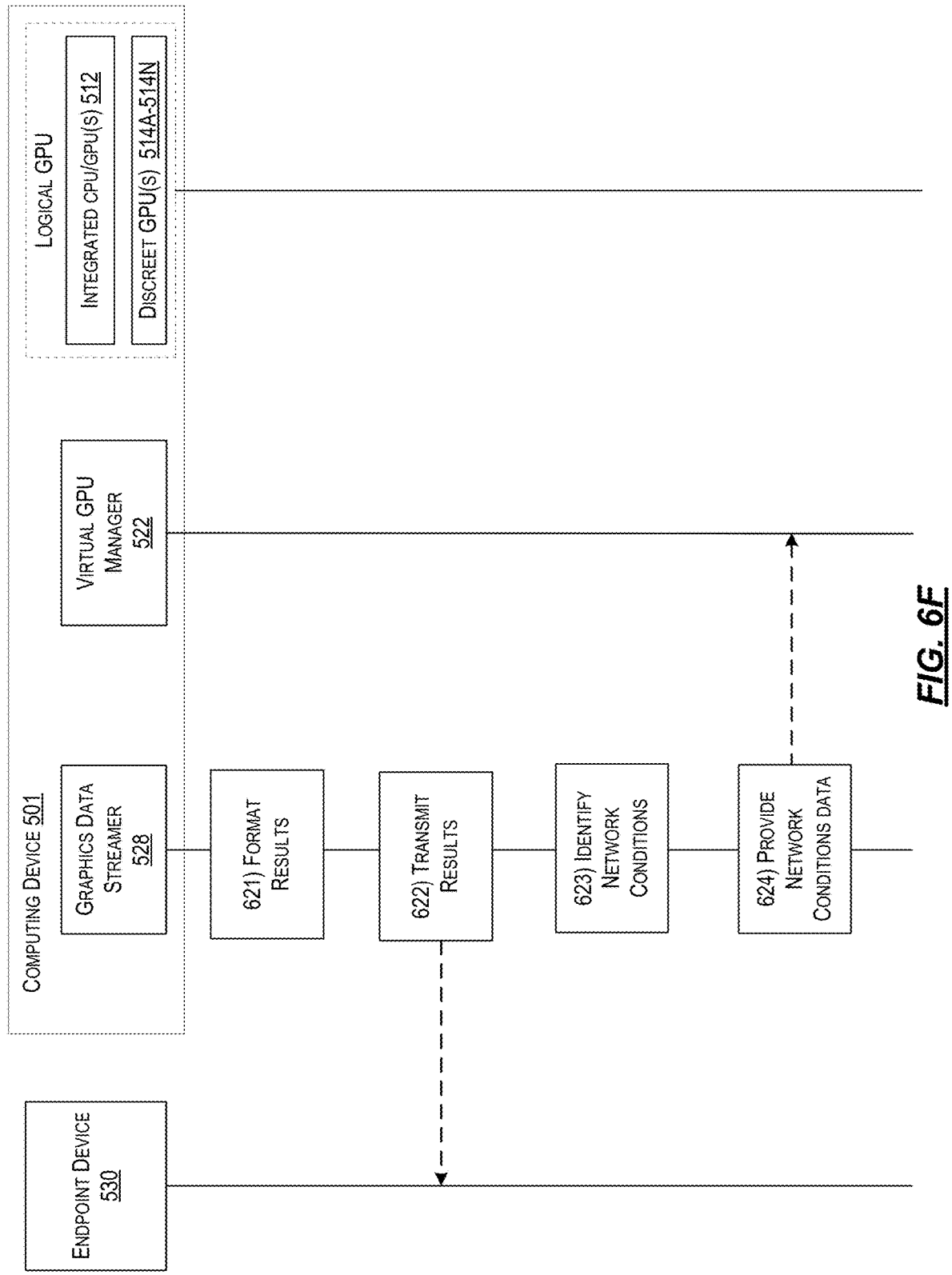

GRAPHICAL RENDERING USING MULTIPLE GRAPHICS PROCESSORS

FIELD

Aspects described herein generally relate to logical frameworks for managing graphics processing units (GPUs). In particular, one or more aspects of the disclosure relate to leveraging multiple graphics processors, by a virtual GPU manager, to optimize the rendering of graphics in either a desktop or virtual desktop environment.

BACKGROUND

Visual rendering is a fundamental feature in modern computing. However, existing methods and systems for rendering visual graphics are deficient due to technological inefficiencies concerning GPU optimization and usage. For example, a current solution for rendering graphics in a desktop and/or virtual desktop environment involves the usage of, at most, one GPU even when more than one are available. A computing device, such as a server or a desktop computing device, may rank any available GPUs based on their performance and computational capacity. Subsequently, the computing device may default to a highest ranked GPU for performing visual renderings. Most servers and workstations today are equipped with central processing unit (CPU) with integrated graphics processors in addition to a dedicated discreet GPU. The integrated GPU is typically less powerful and may belong to an older generation of GPU families as compared to the dedicated discreet GPU onboard. In such cases, the integrated GPU is ranked lower and, as such, is never utilized for graphics processing. The underutilization of the total available graphics processing power results in a sub-optimal scenario where extra CPU cycles are spent on handling the data flow through the graphics processing pipeline. The rendering operations are serialized and the graphics processing pipeline may stall when heavy-duty workload is executed leading to deteriorating graphics performance and quality.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems and methods for performing graphical rendering requests through multiple graphics processors.

In accordance with one or more embodiments, a computing device having a plurality of physical GPUs, at least one processor, and memory, may create a virtual GPU manager. The virtual GPU manager of the computing device may query each of the plurality of physical GPUs to identify processing performance variables of each of the plurality of physical GPUs. The virtual GPU manager may generate a logical GPU corresponding to one or more of the plurality of physical GPUs. The virtual GPU manager may receive a rendering request. The virtual GPU manager may map the rendering request to the logical GPU based on the processing performance variables of the one or more of the plurality of physical GPUs. The virtual GPU may send the rendering request to the mapped logical GPU.

In some embodiments, the querying each of the plurality of physical GPUs to identify may include identifying a processing capacity for each of the plurality of physical GPUs. Further, the virtual GPU manager may enumerate each of the plurality of physical GPUs to identify a number of available physical GPUs. The virtual GPU manager may classify each of the available physical GPUs based on the processing capacity of each of the available physical GPUs. Responsive to classifying each of the available physical GPUs, the virtual GPU manager may rank each of the available physical GPUs based on the processing capacity. In some instances, the mapping of the rendering request to the logical GPU is based on the classification of the available physical GPUs.

In some embodiments, the logical GPU is a logical linkage of each of the plurality of physical GPUs. Alternatively, the logical GPU includes a first logical grouping and a second logical grouping each comprising a logical arrangement of one or more of the plurality of physical GPUs.

In some embodiments, the first logical grouping includes one or more physical GPUs classified with a heavy-load processing capacity and the second logical grouping includes one or more physical GPUs classified with a light-load processing capacity and wherein the first logical grouping and second logical grouping share a common memory allocation.

In some embodiments, sending the rendering request to the mapped logical GPUs may include the virtual GPU manager commanding the first logical grouping to perform one or more rendering operations associated with the rendering request. The virtual GPU manager may store data produced by the first logical grouping in performing the one or more rendering operations in the common memory allocation. Further, the virtual GPU manager may command the second logical grouping to perform one or more post-processing operations of the data stored in the common memory allocation.

In some embodiments, the virtual GPU manager may receive indication of a change to network flow rates corresponding to the rendering request. Responsive to receiving the indication of a change to network flow rates, the virtual GPU manage may reconfigure an allocation of the one or more physical GPUs in the first logical grouping and the second logical grouping.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 6A-6G depict an illustrative event sequence for performing graphical requests through multiple graphics processors according to one or more illustrative aspects of the disclosure.

DETAILED DESCRIPTION

Figure 1:
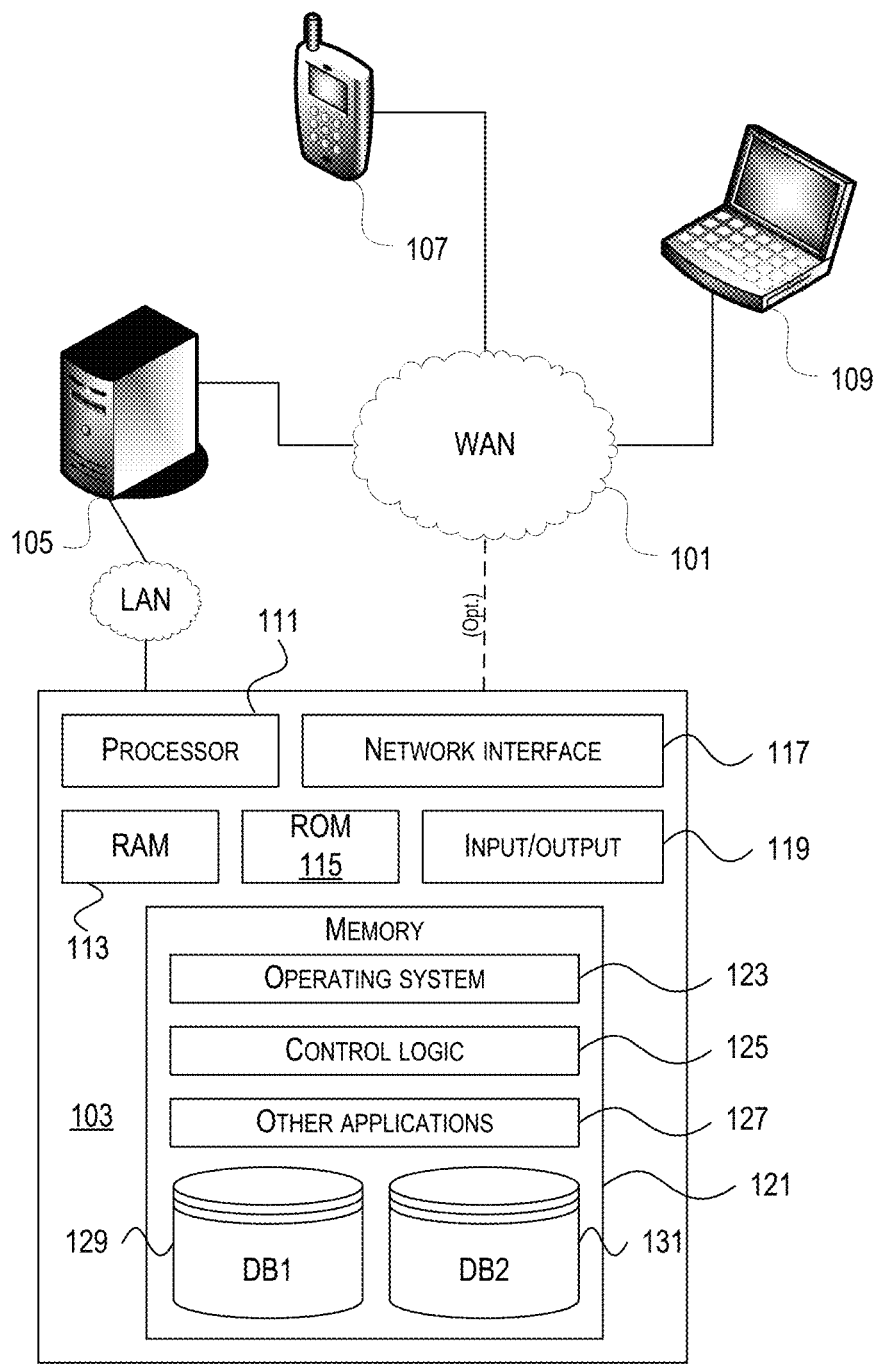
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed to leveraging multiple graphics processors, by a virtual GPU manager, to optimize the rendering of graphics in either a desktop or virtual desktop environment. The virtual GPU manager may enumerate all available physical GPUs, query performance variables including processing capacity of each of the available physical GPUs, and classify each of the physical GPUs based on the queried performance variables. Further, the virtual GPU manager may generate a logical GPU corresponding to one or more of the available physical GPUs. In some instances, the logical GPU may be a logical linkage of each of the available physical GPUs and, in other instances, the logical GPU may include a first logical grouping and a second logical grouping each comprising a logical arrangement of one or more of the available physical GPUs. By doing so, the virtual GPU manager may create a logical construct that allows for the distribution of rendering requests across one or more physical GPUs, which addresses the technological inefficiencies concerning GPU usage in existing systems. Moreover, in instances in which the first and second logical groupings are generated, the groupings may be formed based on the queried performance variables of the available physical GPUs. As a result, the virtual GPU manager may generate a logical construct that allows for the more computational intensive aspects associated with a rendering request to be performed at the logical grouping of the available physical GPUs with a higher processing capacity, for example, and the less computational intensive associated with a rendering request to be performed at the logical grouping of the available physical GPUs with a lower processing capacity. In this way, the virtual GPU manager may also generate a logical construct which addresses the technological inefficiencies concerning GPU optimization of existing systems.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.). In some instances, each component 103, 105, 107, 109 may further include one or more graphics processing units (GPUs), which may control at least a portion of the overall graphical rendering operations performed by data server 103.

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
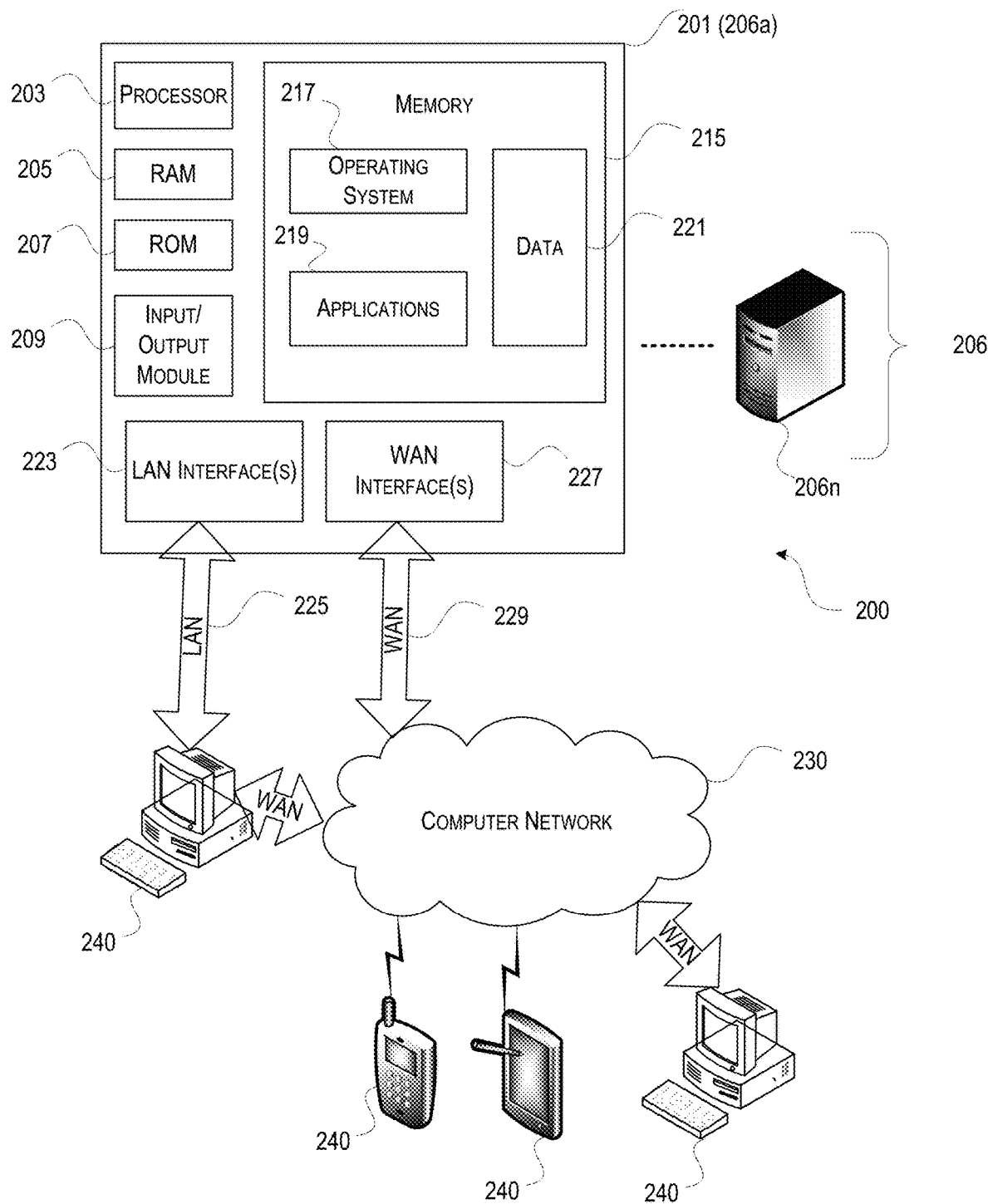
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215. In some instances, computing device 201 may further include one or more graphics processing units (GPUs), which may control at least a portion of the overall graphical rendering operations performed by computing device 201.

I/O module 209 may include a mouse, keypad, touch screen, scanner, optical reader, and/or stylus (or other input device(s)) through which a user of generic computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments, that include any of the above systems or devices, cryptocurreny mining devices (e.g., mining rigs), and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
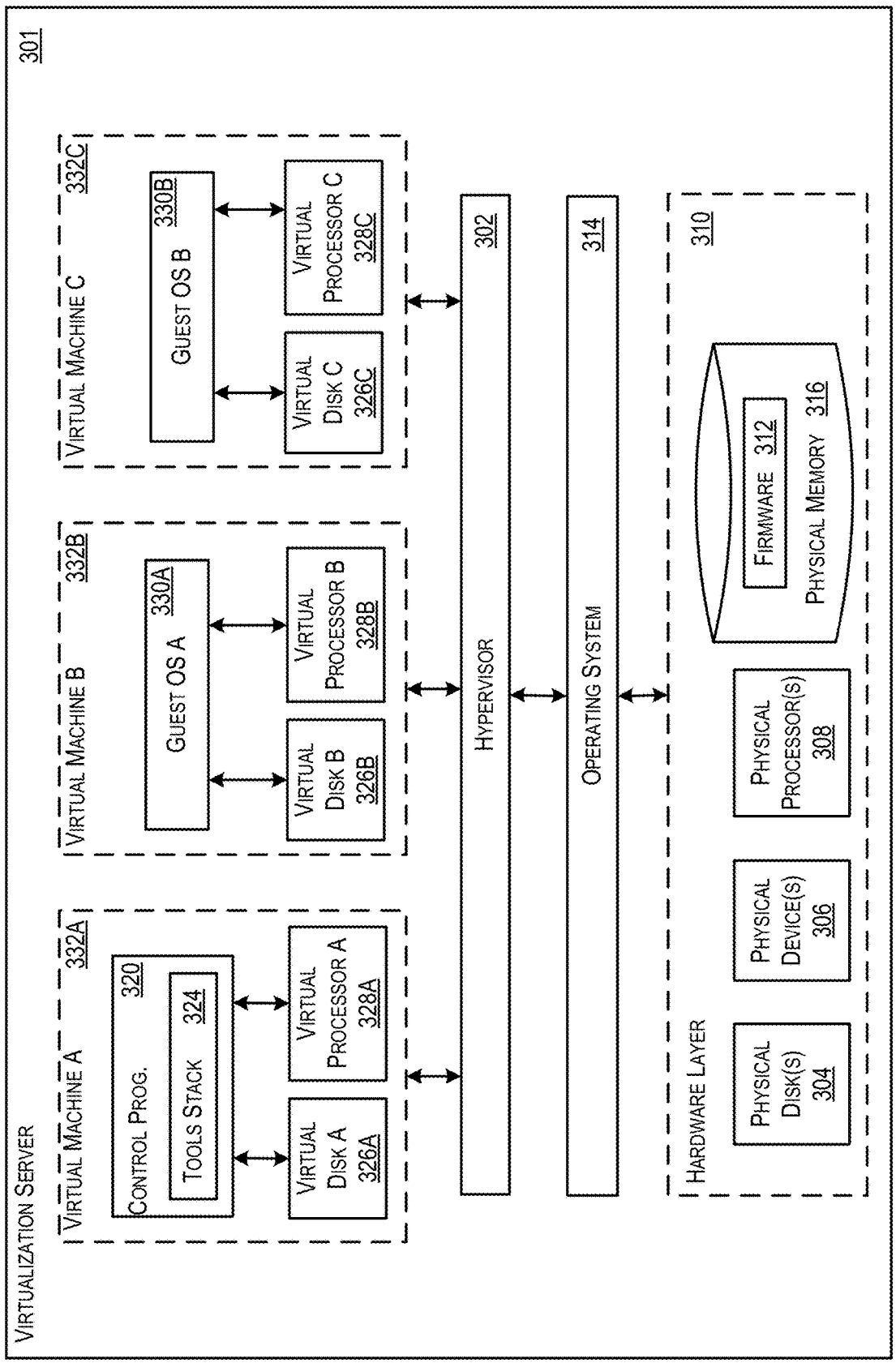
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C, a virtual processor 328A-C, and in some instances, one or more virtual graphics processing devices. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308 (e.g., including GPUs), and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
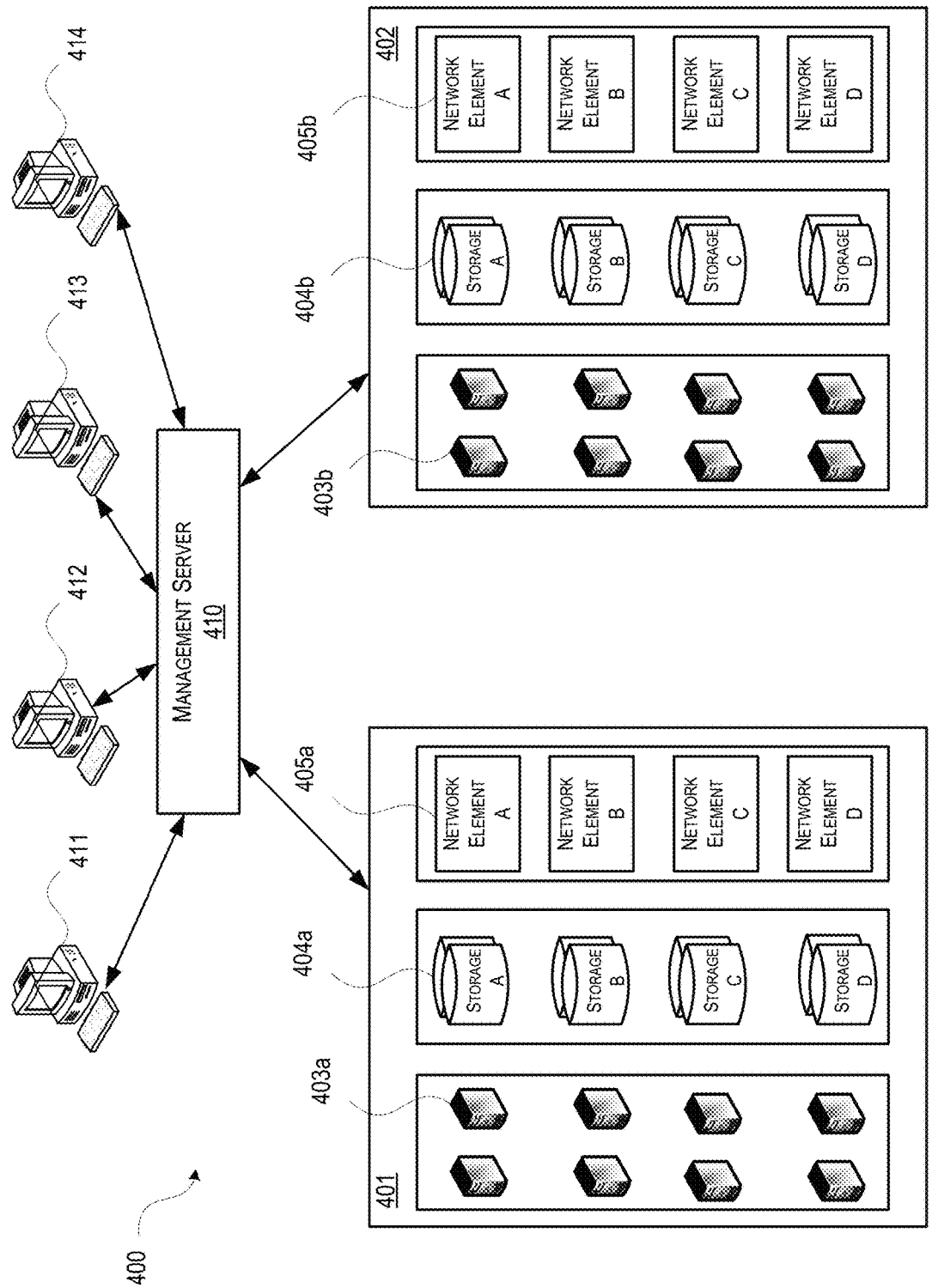
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network resources 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, virtual GPU managers, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Graphical Rendering Using Multiple Graphics Processors

Figure 5:
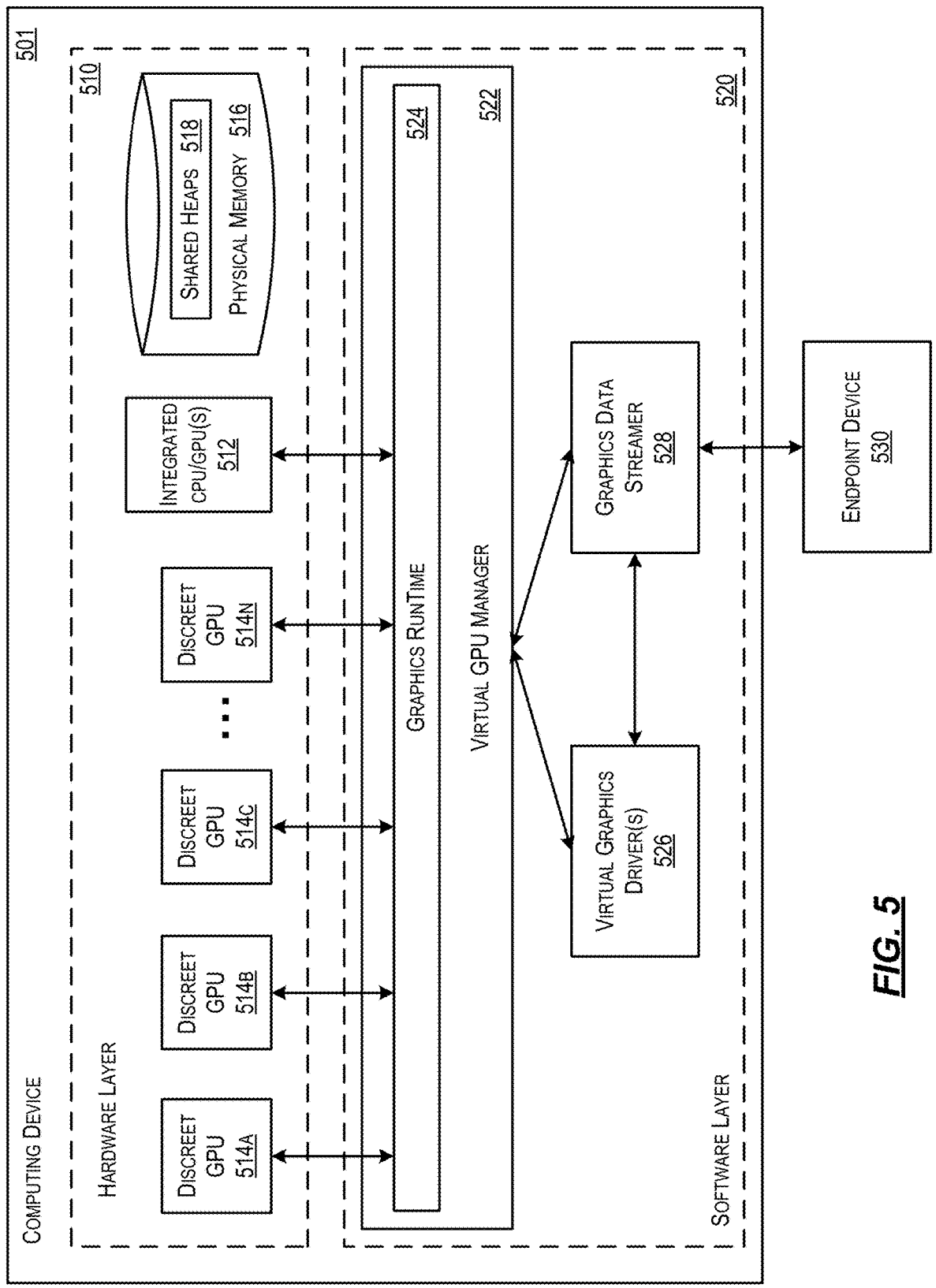
FIG. 5 depicts an illustrative diagram of a system for performing graphical requests through multiple graphics processors according to one or more illustrative aspects of the disclosure.

FIG. 5 depicts an illustrative diagram of a system for performing graphical requests through multiple graphics processors according to one or more illustrative aspects of the disclosure. Computing device 501 may be any one of a personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), that include any of the above systems or devices described in FIGS. 1-4, cryptocurrency mining device(s) (e.g., mining rig), and the like. Computing device 501 may include a hardware layer 510 and a software layer 520.

Hardware layer 510 may include one or more integrated CPU/GPU(s) 512, one or more discreet GPUs 514A-514N, and physical memory 516. Each of the one or more integrated CPU/GPU(s) 512 may be of a similar type, or of a different type. Similarly, each of the one or more discreet GPUs 514A-514N may be of a similar type, or of a different type. As such, the processing performance variables (e.g., power demand, processing bandwidth, processing capacity, floating point operations per second, render output units, texture units, texture fill-rate, pixel fill-rate, base frequency, boost frequency, memory clock rate, memory capacity, memory bandwidth, and the like) may vary across one or more of integrated CPU/GPU(s) 512 and/or one or more of discreet GPUs 514A-514N. In some instances, each of the one or more integrated CPU/GPU(s) 512 and/or one or more discreet GPUs 514A-514N may be used by computing device 501 for general purpose computational processing and/or graphical processing.

Physical memory 516 in the hardware layer 510 may include any type of memory. Physical memory 516 may store data and, in some embodiments, may store one or more programs, or set of executable instructions, which may be configured to be executed by one or more of integrated CPU/GPU(s) 512 and/or one or more of discreet GPUs 514A-514N. Computing device 501 may include an operating system and/or firmware that may be stored in a memory element in physical memory 516 and executed by one or more of integrated CPU/GPU(s) 512 and/or one or more of discreet GPUs 514A-514N.

In some instances, physical memory 516 may further store one or more aspects of software layer 520. For instance, physical memory 516 may include memory elements corresponding to virtual GPU manager 522 and corresponding graphics runtime 524, virtual graphics driver(s) 526, and graphics data streamer 528. Each of elements 522, 524, 526, and 528 may be executable applications and/or software packages that perform one or more of the processes described herein.

Virtual GPU manager 522 may be configured to create a logical association of the one or more integrated CPU/GPU(s) 512 and/or one or more of discreet GPUs 514A-514N in physical memory 516. In doing so, the computing device 501 may be able to allocate graphical rendering requests across the one or more integrated CPU/GPU(s) 512 and/or one or more of discreet GPUs 514A-514N through the logical association in order to optimize hardware utilization.

For example, virtual GPU manager 522 may be configured to enumerate all available integrated CPU/GPUs from the one or more integrated CPU/GPUs 512 and discreet GPUs from the one or more discreet GPUs 514A-514N, query processing performance variables from each of the available physical GPUs, and classify each of the physical GPUs based on the queried performance variables. Responsive to classifying each of the physical GPUs, virtual GPU manager 522 may be configured to rank each of the one or more integrated CPU/GPUs 512 and the one or more discreet GPUs 514A-514N based on the queried performance variables. Through doing so, virtual GPU manager 522 may be able to generate a logical GPU in physical memory 516 corresponding to one or more of the integrated CPU/GPUs 512 and/or one or more of the discreet GPUs 514A-514N. The logical GPU generated by the virtual GPU manager 522 may be configured in a super-GPU model in which each of the available physical GPUs are aggregated and/or interlinked through a logical GPU linkage, and/or in a multi-adapter model in which the physical GPUs are arranged into at least a first and second logical grouping.

In regard to the super-GPU model, the logical linkage of each of the available physical GPUs may be identified by the virtual GPU manager 522 to the virtual graphics driver 526 as a single graphical processing object. Thus, graphical rendering requests may be distributed across each of the available physical GPUs in the logical linkage, thereby aggregating the processing power of the summation of available physical GPUs into a single logical object. In this way, during performance of rendering requests, each of the available physical GPUs are actively leveraged to perform the computations corresponding to the rendering request, as opposed to conventional systems in which only the processing capacity of a most powerful available physical GPU is harnessed.

Additionally and/or alternatively, a plurality of super-GPU views may be generated in order to facilitate graphically computational intensive applications such as split-screen rendering. For example, virtual GPU manager 522 may generate a first super-GPU view which may be a first logical linkage of a first group of available physical GPUs, a second super-GPU view which may be a second logical linkage of a second group of available physical GPUs, a third super-GPU view which may be a third logical linkage of a third group of available physical GPUs, and so on. Virtual GPU manager 522 may distribute processing power equally across each of the super-GPU views or, alternatively, may allocate the available physical GPUs between the super-GPU views based the processing performance variables in a task specific manner. For instance, the first super-GPU view may be associated with an allocation of available physical GPUs with processing performance variables conducive for collision detection, animation, morphing, and acceleration techniques using spatial subdivision schemes (e.g., quadtrees, octrees, etc.), and the like, the second super-GPU view may be associated with an allocation of available physical GPUs with processing performance variables conducive for model and camera transformation, lighting, projection, clipping, window/viewport transformation, and the like, the third super-GPU view may be associated with an allocation of available physical GPUs with processing performance variables conducive for pixel formatting, frame optimization, hardware encoding, and image processing techniques such as sharpening and watermarking, and so on.

In regard to the multi-adapter model, the first and second logical groupings of GPUs may be determined by virtual GPU manager 522 based on the processing performance variables of each of the available physical GPUs (e.g., integrated CPU/GPUs 512 and/or one discreet GPUs 514A-514N). For example, the first logical grouping may correspond to one or more of the available physical GPUs with heavy-load processing capacity identified from the processing performance variables and the second logical grouping may correspond to one or more of the available physical GPUs with light-load processing capacity identified from the processing performance variables. During performance of graphical rendering requests, the first logical grouping may be responsible for performing rendering operations requiring high-load processing capacity, whereas the second logical grouping may be responsible for performing post-processing operations requiring light-load processing capacity. For instance, the first logical grouping may perform processes such as collision detection, animation, morphing, acceleration techniques using spatial subdivision schemes, model and camera transformation, lighting, projection, clipping, window/viewport transformation, rasterization, and the like. The second logical grouping may perform processes such as pixel formatting, frame optimization, hardware encoding, and image processing techniques such as sharpening and watermarking.

Virtual GPU manager 522 may further be configured to create shared memory heaps 518 (e.g., cross-shared memory heaps) as one or more memory elements in physical memory 516. Shared memory heaps 518 may be a shared memory space associated with graphics runtime 524 which may serve as a commonly and/or mutually accessible data allocation area for the available physical GPUs corresponding to the logical GPU(s) during performance of graphical rendering processes. Through graphics runtime 524, which may establish the order of operations and timing sequences for performing graphical processing requests, virtual GPU manager 522 may establish shared memory heaps 518 for mapping input/output data flows between the logical GPU(s). For example, in instances in which a multi-adapter model has been generated by virtual GPU manager 522, the processing outputs from a first logical grouping may be accessible in real-time through the shared memory heaps 518 for a second logical grouping. Similarly, in instances in which a plurality of super-GPU views are generated by virtual GPU manager 522, the processing outputs generated by each of the plurality of super-GPU views may be accessible in real-time by each of the super-GPU views in the plurality of super-GPU views.

Computing device 501 may further include virtual graphics driver(s) 526 in software layer 520. Virtual graphics driver(s) 526 may include programs and/or software packages that enable the one or more discreet GPUs 514A-514N and/or integrated CPU/GPU(s) 512 to be interoperable with the other computing components, both hardware and software, of computing device 501. In particular, virtual graphic driver(s) 526 may provide a communicative framework through which virtual GPU manager 522 is able to manage the one or more discreet GPUs 514A-514N and/or integrated CPU/GPU(s) 512. In instances in which the one or more discreet GPUs 514A-514N and/or integrated CPU/GPU(s) 512 are of a dissimilar type, virtual graphics driver(s) 526 may include a variety of graphics drivers in association with the various types of the one or more discreet GPUs 514A-

514N and/or integrated CPU/GPU(s) 512. Further, virtual GPU manager 522 may be configured to initiate a download of the virtual graphics driver(s) 526 with one or more external computing devices in the event of a hardware change to the one or more discreet GPUs 514A-514N and/or integrated CPU/GPU(s) 512 and/or to receive an update to the virtual graphics driver(s) 526 from the one or more external computing devices.

Computing device 501 may further include graphics data streamer 528 in software layer 520. Graphics data streamer 528 may be configured to interface with endpoint device 530 by way of a communication interface and/or presentation layer protocol through a network. In instances in which computing device 501 is one or more server computers, endpoint device 530 may be a user computing device such a desktop computer, laptop computer, tablet computing device, mobile computing device, and the like. Alternatively, in instances in which computing device 501 is a user computing device of any of the types described herein, endpoint device 530 may be a wired and/or wirelessly connected viewing device such as a monitor, television, and the like.

In regard to instances in which computing device 501 is one or more server computers, graphics data streamer 528 may be configured to receive graphical rendering requests from endpoint device 530 by way of a communication interface and/or presentation layer protocol and to transmit data corresponding to the performance of the graphical rendering requests by way of a communication interface and/or presentation layer protocol. Further, graphics data streamer 528 may be configured to identify network conditions such as bandwidth, round-trip transmission rate, and the like. As will be described below, graphics data streamer 528 may be able to provide such network conditions data to virtual GPU manager 522 for the purposes of recalibrating and/or reallocating the distribution of the one or more discreet GPUs 514A-514N and/or integrated CPU/GPU(s) 512 in the logical GPU.

In regard to instances in which computing device 501 is a user computing device, graphics data streamer 528 may be configured to transmit data corresponding to the performance of graphical rendering requests by way of the communication interface and/or presentation layer protocol through the network. Graphics data streamer 528 may be configured to identify network conditions such as bandwidth, round-trip transmission rate, and the like and may be able to provide such network conditions data to virtual GPU manager 522 for the purposes of recalibrating and/or reallocating the distribution of the one or more discreet GPUs 514A-514N and/or integrated CPU/GPU(s) 512 in the logical GPU.

For example, in arrangements in which computing device 501 is either one or more server computers or a user computing device, graphics data streamer 528 may identify network conditions data from the networking fostering communicative interaction with endpoint device 530 and provide such data to virtual GPU manager 522. In the event that the network conditions data indicates network congestion (e.g., low bandwidth availability, high round-trip transmission rates, etc.), virtual GPU manager 522 may decrease or increase the number of the one or more discreet GPUs 514A-514N and/or integrated CPU/GPU(s) 512 in the logical GPU. Similarly, in the event that the network conditions data indicates network availability (e.g., high bandwidth availability, low round-trip transmission rates, etc.), virtual GPU manager 522 may increase or decrease the number of the one or more discreet GPUs 514A-514N and/or integrated CPU/GPU(s) 512 in the logical GPU.

In regard to instances in which the logical GPU is generated in the super-GPU model, the virtual GPU manager 522 may increase or decrease the number of one or more discreet GPUs 514A-514N and/or integrated CPU/GPU(s) 512 in the super-GPU model based on network conditions data. For example, if the network conditions data indicates network congestion (e.g., low bandwidth availability, high round-trip transmission rates, etc.), virtual GPU manager 522 may decrease or increase the number of the one or more discreet GPUs 514A-514N and/or integrated CPU/GPU(s) 512 in the super-GPU. Similarly, if the network conditions data indicates network availability (e.g., high bandwidth availability, low round-trip transmission rates, etc.), virtual GPU manager 522 may increase or decrease the number of the one or more discreet GPUs 514A-514N and/or integrated CPU/GPU(s) 512 in the super-GPU model.

Additionally and/or alternatively, in arrangements in which a plurality of super-GPU views are generated by virtual GPU manager 522 in relation to the one or more discreet GPUs 514A-514N and/or integrated CPU/GPU(s) 512, virtual GPU manager 522 may be configured to dynamically reconfigure and/or reallocate the number of active physical GPUs in one or more of the plurality of super-GPU views based on network conditions. For example, if the network conditions data indicates network congestion (e.g., low bandwidth availability, high round-trip transmission rates, etc.), virtual GPU manager 522 may decrease or increase the number of the one or more discreet GPUs 514A-514N and/or integrated CPU/GPU(s) 512 in one or more of the plurality of super-GPU views, reallocate one or more of the discreet GPUs 514A-514N and/or integrated CPU/GPU(s) 512 between one or more of the plurality of super-GPU views, and/or delete/decommission one or more of the plurality of super-GPU views by removing the corresponding one or more discreet GPUs 514A-514N and/or integrated CPU/GPU(s) 512 from the logical linkage. Similarly, if the network conditions data indicates network availability (e.g., high bandwidth availability, low round-trip transmission rates, etc.), virtual GPU manager 522 may increase or decrease the number of the one or more discreet GPUs 514A-514N and/or integrated CPU/GPU(s) 512 in one or more of the plurality of super-GPU views, reallocate one or more of the discreet GPUs 514A-514N and/or integrated CPU/GPU(s) 512 between one or more of the plurality of super-GPU views, and/or onboard/commission one or more additional super-GPU views by adding one or more discreet GPUs 514A-514N and/or integrated CPU/GPU(s) 512 to the logical linkage.

In regard to instances in which the logical GPU is generated in the multi-adapter model, the virtual GPU manager 522 may increase or decrease the number of one or more discreet GPUs 514A-514N and/or integrated CPU/GPU(s) 512 in the logical groupings of the multi-adapter model based on network conditions data. For example, if the network conditions data indicates network congestion (e.g., low bandwidth availability, high round-trip transmission rates, etc.), virtual GPU manager 522 may decrease or increase the number of the one or more discreet GPUs 514A-514N and/or integrated CPU/GPU(s) 512 in one or more of logical groupings (e.g., first logical grouping, second logical grouping, and so on), reallocate one or more of the discreet GPUs 514A-514N and/or integrated CPU/GPU(s) 512 between one or more of the logical groupings, and/or delete/decommission one or more of the logical groupings by removing the corresponding one or more discreet GPUs 514A-514N and/or integrated CPU/GPU(s) 512 from the logical arrangement. Similarly, if the network conditions data indicates network availability (e.g., high bandwidth availability, low round-trip transmission rates, etc.), virtual GPU manager 522 may increase or decrease the number of the one or more discreet GPUs 514A-514N and/or integrated CPU/GPU(s) 512 in one or more of the plurality of logical groupings, reallocate one or more of the discreet GPUs 514A-514N and/or integrated CPU/GPU(s) 512 between one or more of the logical groupings, and/or onboard/commission one or more additional logical groupings by adding one or more discreet GPUs 514A-514N and/or integrated CPU/GPU(s) 512 to the logical arrangement.

FIGS. 6A-6G depict an illustrative event sequence for performing graphical requests through multiple graphics processors according to one or more illustrative aspects of the disclosure. The events may be performed in the order depicted and described, or in any other arrangement and/or sequence.

Figure 6A:
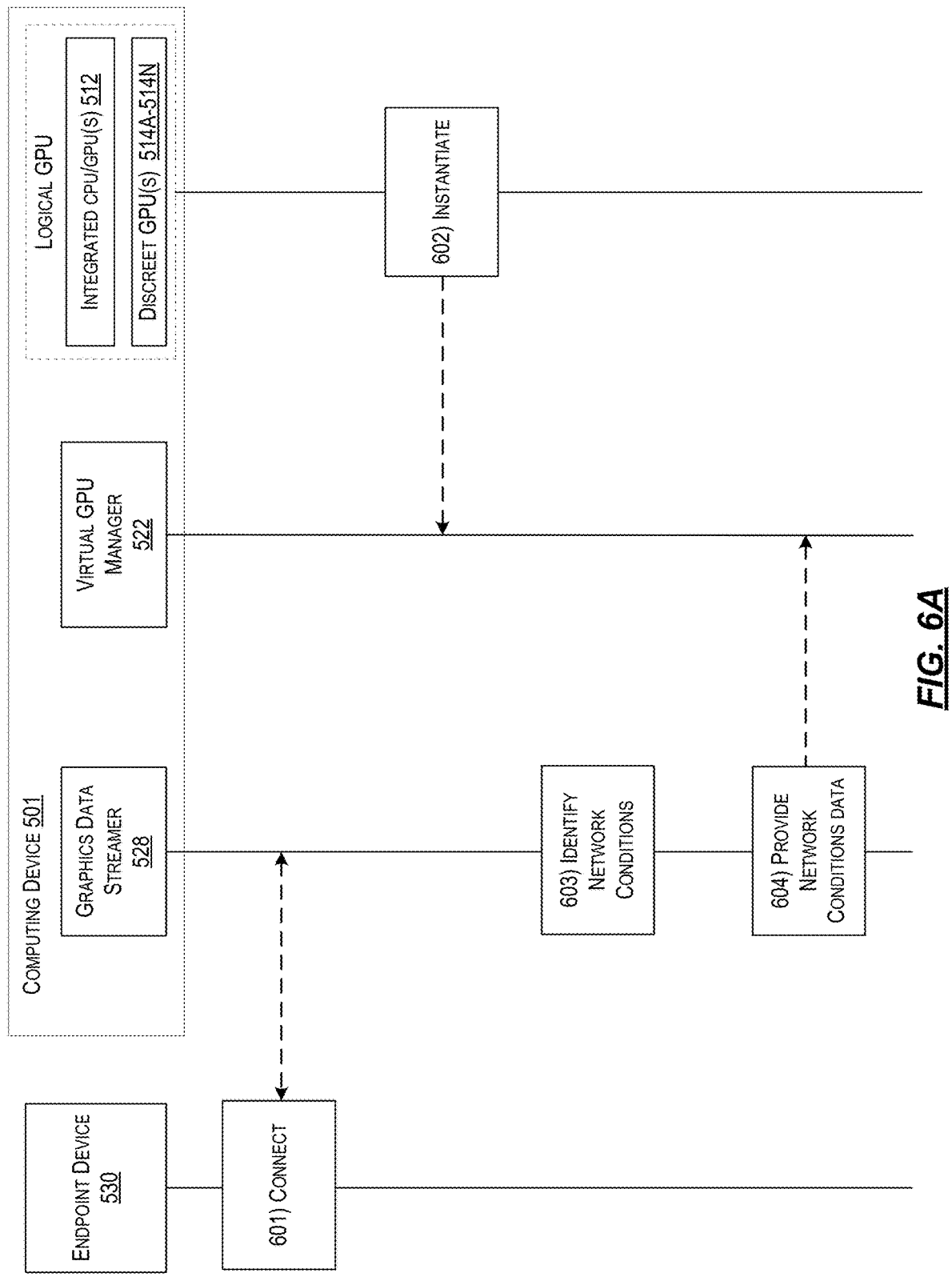

Referring to FIG. 6A, at step 601, endpoint device 530 and graphics data streamer 528 of computing device 501 may connect. In instances in which computing device 501 is one or more server computers and endpoint device 530 is a user computing device, as well as when computing device 501 is a user computing device and endpoint device 530 is a display device, the request for connection may originate at either computing device 501 or endpoint device 530. The forming of the connection may involve a communication interface at endpoint device 530 and a communication interface and graphics data streamer 528 at computing device 501.

At step 602, at least one of the one or more integrated CPU/GPU(s) 512 may instantiate virtual GPU manager 522. In particular, at least one of the one or more integrated CPU/GPU(s) 512 may run an application and/or execute computer-executable instructions corresponding to virtual GPU manager 522 from physical memory 516 to generate an instance of virtual GPU manager 522 in memory. Alternatively, virtual GPU manager 522 may be launched from physical memory 516 by at least one of the one or more integrated CPU/GPU(s) 512 upon activation of computing device 501 or upon launch of an application which initiates graphical processing requests.

At step 603, graphics data streamer 528, through a communication interface of computing device 501, may identify network conditions related to the communicative connection with endpoint device 530. As stated above, the network conditions may include one or more of bandwidth availability and round-trip transmission rates. In some instances, the identification of network conditions may come from network data generated during the connection formed with endpoint device 530 at step 601. Alternatively, graphics data streamer 528 may ping endpoint device 530 by the communication interface of computing device 501 through the network to generate data associated with the conditions of the network. At step 604, graphics data streamer 528 may provide the network conditions data to virtual GPU manager 522.

Figure 6B:
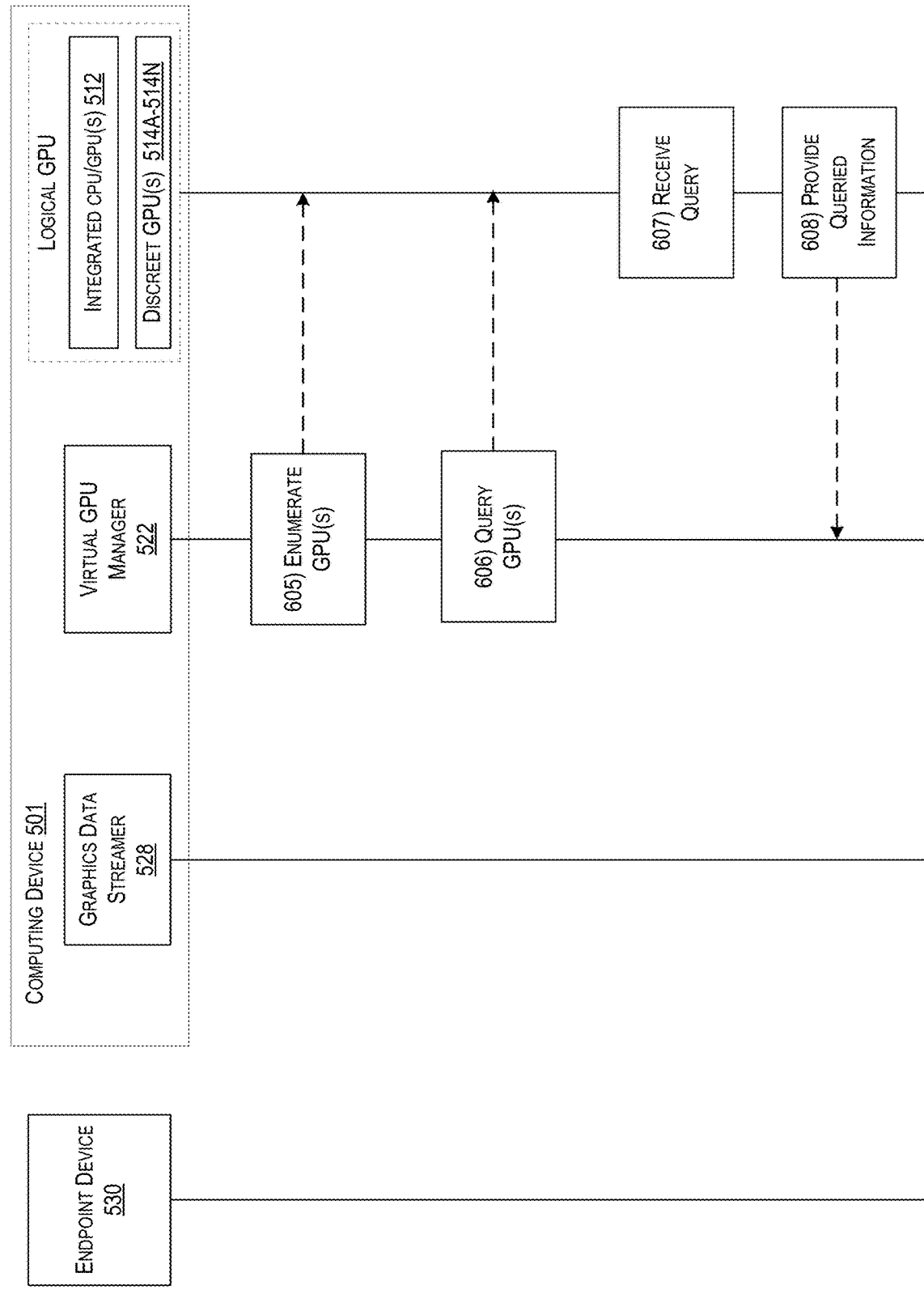

Referring to FIG. 6B, at step 605, virtual GPU manager 522 may enumerate one or more discreet GPUs 514A-514N and/or integrated CPU/GPU(s) 512. To do so, virtual GPU manager 522 may determine a particular number of available physical GPUs from the one or more discreet GPUs 514A-514N and/or integrated CPU/GPU(s) 512. In some instances, the particular number of available physical GPUs from the one or more discreet GPUs 514A-514N and/or integrated CPU/GPU(s) 512 may correspond to the total number of the one or more discreet GPUs 514A-514N and/or integrated CPU/GPU(s) 512. In other instances, the particular number of available physical GPUs from the one or more discreet GPUs 514A-514N and/or integrated CPU/GPU(s) 512 may correspond to a number of the one or more discreet GPUs 514A-514N and/or integrated CPU/GPU(s) 512 which are not being used for other purposes.

At step 606, virtual GPU manager 522 may query each of the one or more discreet GPUs 514A-514N and/or integrated CPU/GPU(s) 512 enumerated at step 605. The querying may entail requesting processing performance variables from each of the one or more enumerated discreet GPUs 514A-514N and/or integrated CPU/GPU(s) 512. As stated above, the processing performance variables may include one or more of power demand, processing bandwidth, processing capacity, floating point operations per second, render output units, texture units, texture fill-rate, pixel fill-rate, base frequency, boost frequency, memory clock rate, memory capacity, memory bandwidth, and the like. In some instances, the querying performed by virtual GPU manager 522 may be done simultaneously across each of the one or more enumerated discreet GPUs 514A-514N and/or integrated CPU/GPU(s) 512, or may be done sequentially.

At step 607, each of the one or more enumerated discreet GPUs 514A-514N and/or integrated CPU/GPU(s) 512 queried by virtual GPU manager 522 at step 606 may receive the requests for processing performance variables. In some instances, the queries may be received simultaneously at each of the one or more enumerated discreet GPUs 514A-514N and/or integrated CPU/GPU(s) 512, or may be received sequentially. At step 608, each of the one or more enumerated discreet GPUs 514A-514N and/or integrated CPU/GPU(s) 512 may provide the information corresponding to the queried and/or requested processing performance variables to virtual GPU manager 522. In some instances, the queried and/or requested information may be provided simultaneously by each of the one or more enumerated discreet GPUs 514A-514N and/or integrated CPU/GPU(s) 512 to virtual GPU manager 522, or may be provided sequentially.

Figure 6C:
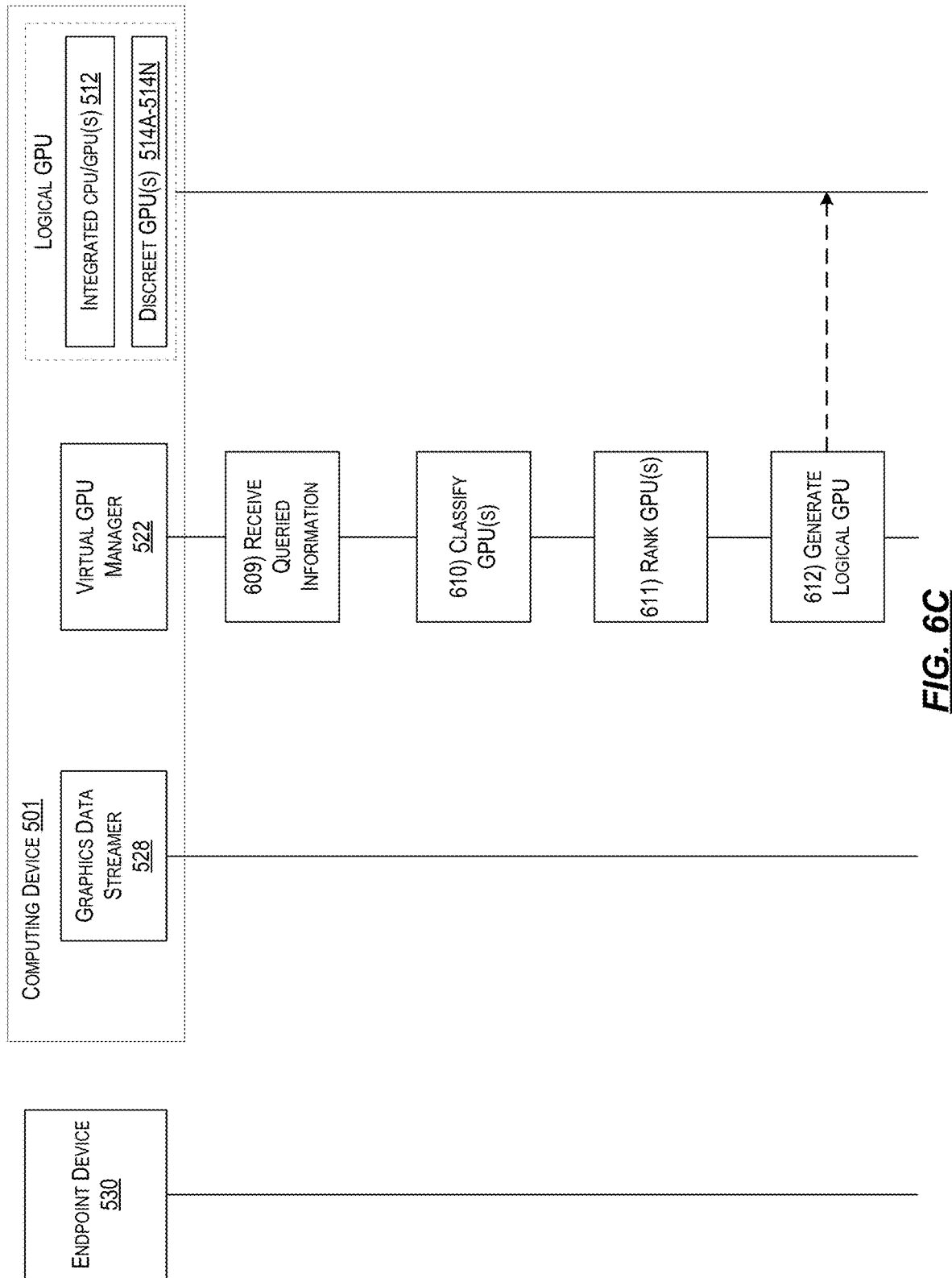

Referring to FIG. 6C, at step 609, virtual GPU manager 522 of computing device 501 may receive the queried information corresponding processing performance information from each of the one or more enumerated discreet GPUs 514A-514N and/or integrated CPU/GPU(s) 512. In some instances, the queried and/or requested information may be received simultaneously by virtual GPU manager 522, or may be received sequentially.

At step 610, virtual GPU manager 522 may classify each of the one or more one or more enumerated discreet GPUs 514A-514N and/or integrated CPU/GPU(s) 512 based on the processing performance information received at step 609. In some instances, the classification may concern identifying each of the one or more enumerated discreet GPUs 514A-514N and/or integrated CPU/GPU(s) 512 as being either high-load processing or light-load processing. To do so, virtual GPU manager 522 may compare one or more items of the processing performance information with corresponding data thresholds related to high-load processing or light-load processing. For example, virtual GPU manager 522 may compare the data for the processing capacity of each of the one or more enumerated discreet GPUs 514A-514N and/or integrated CPU/GPU(s) 512 with the data threshold related processing capacity to identify if each of the one or more enumerated discreet GPUs 514A-514N and/or integrated CPU/GPU(s) 512 are high-load processing or light-load processing. If the data for the processing capacity of a particular discreet GPUs 514A-514N and/or integrated CPU/GPU(s) 512 is greater than the data threshold associated with processing capacity, then the particular physical GPU may be identified as being high-load processing. Conversely, If the data for the processing capacity of a particular discreet GPUs 514A-514N and/or integrated CPU/GPU(s) 512 is less than or equal to the data threshold associated with processing capacity, then the particular physical GPU may be identified as being light-load processing.

At step 611, virtual GPU manager 522 may rank each of the one or more enumerated discreet GPUs 514A-514N and/or integrated CPU/GPU(s) 512 based on the respective processing performance information. In some instances, the rankings assigned by virtual GPU manager 522 may be done in relation to the classifications (e.g., high-load processing and light-load processing) identified at step 610 but, in other instances, the rankings assigned by the virtual GPU manager 522 may be done in across the classifications (e.g., regardless of the classification identified at step 610). The rankings may be assigned by virtual GPU manager 522 based on a data value associated with one or more of the processing performance variables. For instance, a processing unit from the one or more enumerated discreet GPUs 514A-514N and/or integrated CPU/GPU(s) 512 with a higher processing capacity may be ranked above a processing unit from the one or more enumerated discreet GPUs 514A-514N and/or integrated CPU/GPU(s) 512 with a lower processing capacity.

Additionally and/or alternatively, virtual GPU manager 522 may calculate a ranking score for each of the one or more enumerated discreet GPUs 514A-514N and/or integrated CPU/GPU(s) 512. The ranking score may be an advance data metric which serves as a numerical indication of overall processing capability based on one or more of the processing performance variables. Virtual GPU manager 522 may rank each of the one or more enumerated discreet GPUs 514A-514N and/or integrated CPU/GPU(s) 512 based on the ranking score from highest ranking score to lowest ranking score.

At step 612, virtual GPU manager 522 may generate a logical GPU corresponding to the one or more enumerated discreet GPUs 514A-514N and/or integrated CPU/GPU(s) 512 based on one or more of the received queried information, classifications of the each of the one or more enumerated discreet GPUs 514A-514N and/or integrated CPU/GPU(s) 512, and/or rankings of the each of the one or more enumerated discreet GPUs 514A-514N and/or integrated CPU/GPU(s) 512. The logical GPU generated by the virtual GPU manager 522 may be configured in a super-GPU model in which each of the available physical GPUs are aggregated and/or interlinked through a logical GPU linkage, and/or in a multi-adapter model in which the physical GPUs are arranged into at least a first and second logical grouping.

In regard to the super-GPU model, the virtual GPU manager 522 may generate the logical linkage of each of the available physical GPUs. In some instances, the virtual GPU manager 522 may generate the logical linkage of the available physical GPUs classified as high-load processing or light-load processing. As such, available physical GPUs that do not fulfill the classification requirements may be omitted from the logical linkage and held in waiting for future assignment. In other instances, virtual GPU manager 522 may generate the logical linkage of the available physical GPUs based on the ranking score being above a certain predetermined threshold. Again, available physical GPUs that do not have a ranking score above the certain predetermined threshold may be omitted from the logical linkage and held in waiting for future assignment.

Additionally and/or alternatively, a plurality of super-GPU views may be generated by virtual GPU manager 522. In some instances, each of the plurality of super-GPU views may be associated with an equal number of available physical GPUs. In other instances, each of the plurality of super-GPU views may have an equal aggregate ranking score corresponding to the available physical GPUs in associated with each super-GPU view.

In regard to the multi-adapter model, the logical groupings of GPUs may be determined by virtual GPU manager 522 based on the processing performance variables of each of the available physical GPUs (e.g., integrated CPU/GPUs 512 and/or one discreet GPUs 514A-514N). For example, the first logical grouping may correspond to one or more of the available physical GPUs with heavy-load processing capacity identified from the processing performance variables and the second logical grouping may correspond to one or more of the available physical GPUs with light-load processing capacity identified from the processing performance variables.

Figure 6D:
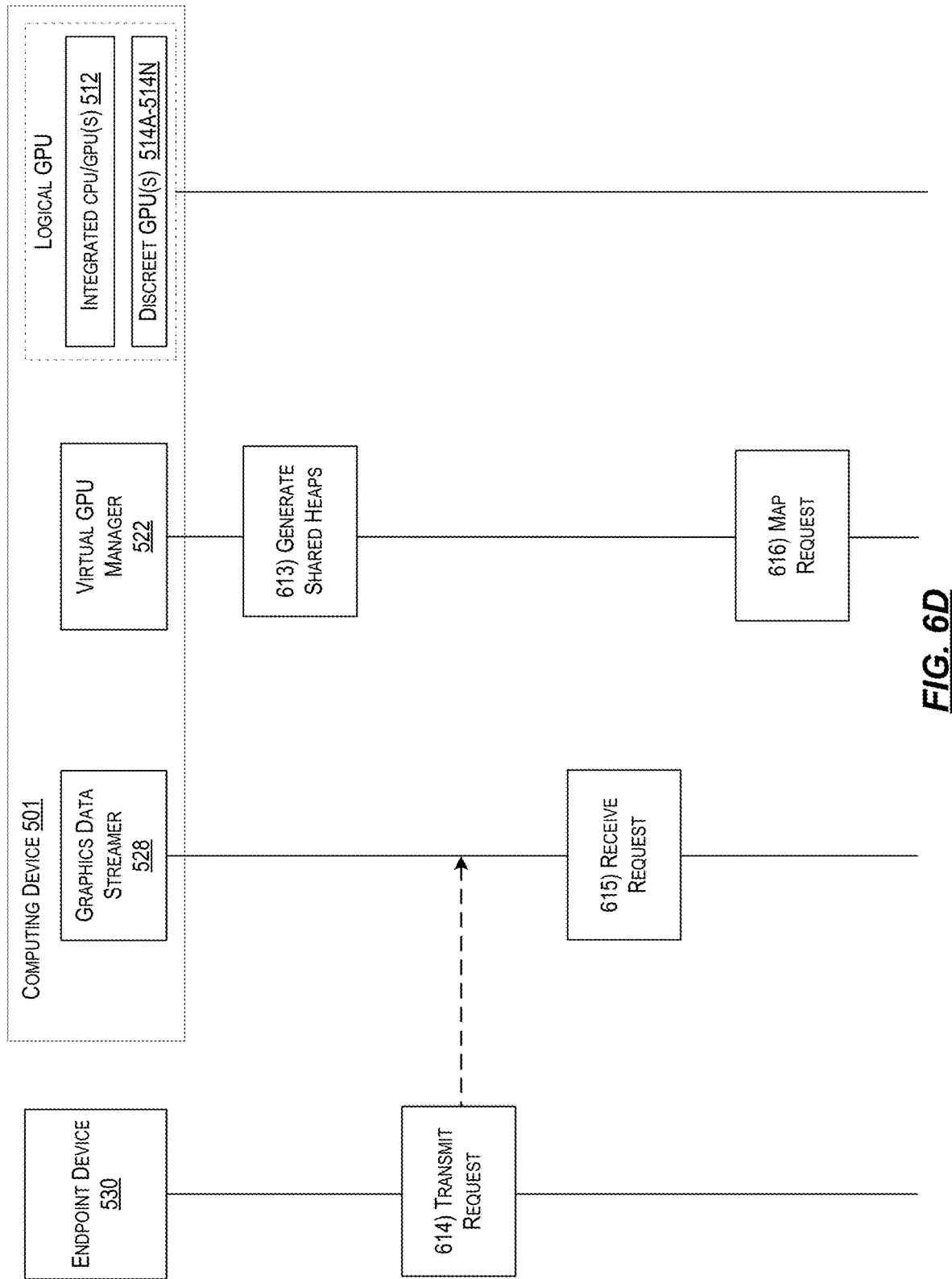

Referring to FIG. 6D, at step 613, virtual GPU manager 522 may generate cross-shared memory heaps 518 in physical memory 516. As stated above, cross-shared memory heaps 518 may be a shared memory space for each of the one or more discreet GPUs 514A-514N and/or integrated CPU/GPU(s) 512 of the logical GPU generated in step 612. Virtual GPU manager 522 may establish shared memory heaps 518 for mapping input/output data flows between the logical GPU(s). For example, in instances in which a super-GPU model has been generated by virtual GPU manager 522, the processing outputs from each of the one or more discreet GPUs 514A-514N and/or integrated CPU/GPU(s) 512 in the logical linkage may be communally accessible in shared memory heaps 518. In instances in which a plurality of super-GPU views are generated by virtual GPU manager 522, the processing outputs generated by each of the plurality of super-GPU views may be accessible in real-time by each of the super-GPU views in the plurality of super-GPU views. Similarly, in instances in which a multi-adapter model has been generated by virtual GPU manager 522, the processing outputs from a first logical grouping may be accessible in real-time through the shared memory heaps 518 for a second logical grouping. In cases in which additional logical groupings (e.g., third logical grouping, fourth logical grouping, etc.) are formed, the processing outputs may be available through shared cross-shared memory heaps 518 in a similar manner.

At step 614, in instances in which computing device 501 is one or more server computers and endpoint device 530 is a user computing device, endpoint device 530 may transmit a graphical rendering request to computing device 501 and, in particular, to graphics data streamer 528 through the a communication interface of computing device 501. In instances in which computing device 501 is a user computing device and endpoint device 530 is a display device, step 614 may not be performed.

At step 615, again in instances in which computing device 501 is one or more server computers and endpoint device 530 is a user computing device, graphics data streamer 528 may receive the graphical processing request from endpoint device 530 and through a communication interface of computing device 501. Alternatively, in instances in which computing device 501 is a user computing device and endpoint device 530 is a display device, virtual GPU manager 522 may receive the graphical processing request from the operating system and/or another application operating on computing device 501.

At step 616, virtual GPU manager 522 may map the graphical processing request from either the endpoint device 530 or the operating system and/or another application operating on computing device 501 to the logical GPU by way of the one or more virtual graphics driver(s) 526 based on one or more of the received queried information, classifications of the each of the one or more enumerated discreet GPUs 514A-514N and/or integrated CPU/GPU(s) 512, and/or rankings of the each of the one or more enumerated discreet GPUs 514A-514N and/or integrated CPU/GPU(s) 512.

In regard to the received queried information, virtual GPU manager 522 may map the graphical processing request to the logical GPU based on one or more processing performance variables including at least processing capacity of the one or more discreet GPUs 514A-514N and/or integrated CPU/GPU(s) 512. For example, aspects of the graphical processing request that require high processing capacity (e.g., collision detection, animation, morphing, acceleration techniques using spatial subdivision schemes, model and camera transformation, lighting, projection, clipping, window/viewport transformation, and rasterization) may be mapped to one or more of the discreet GPUs 514A-514N and/or integrated CPU/GPU(s) 512 with high processing capacity within the logical GPU and aspects of the graphical processing request that do not require high processing capacity (e.g., pixel formatting, frame optimization, hardware encoding, and image processing techniques such as sharpening and watermarking, and the like) may be mapped to one or more of the discreet GPUs 514A-514N and/or integrated CPU/GPU(s) 512 with light processing capacity within the logical GPU.

In regard to the classifications of each of the one or more of the enumerated discreet GPUs 514A-514N and/or integrated CPU/GPU(s) 512, virtual GPU manager 522 may map the graphical processing request to the logical GPU based on the classification of the one or more discreet GPUs 514A-514N and/or integrated CPU/GPU(s) 512 as being either high-load processing or light-load processing. For example, aspects of the graphical processing request that require high processing capacity may be mapped to one or more of the discreet GPUs 514A-514N and/or integrated CPU/GPU(s) 512 classified as high-load processing within the logical GPU and aspects of the graphical processing request that do not require high processing capacity may be mapped to one or more of the discreet GPUs 514A-514N and/or integrated CPU/GPU(s) 512 classified as light-load processing within the logical GPU.

In regard to the rankings of the each of the one or more enumerated discreet GPUs 514A-514N and/or integrated CPU/GPU(s) 512, virtual GPU manager 522 may map the graphical processing request to the logical GPU based on the ranking of the one or more discreet GPUs 514A-514N and/or integrated CPU/GPU(s) 512 from highest processing capacity to lowest processing capacity. For example, aspects of the graphical processing request that require high processing capacity may be mapped to one or more of the discreet GPUs 514A-514N and/or integrated CPU/GPU(s) 512 with a ranking above a predetermined ranking threshold associated with processing capacity and aspects of the graphical processing request that do not require high processing capacity may be mapped to one or more of the discreet GPUs 514A-514N and/or integrated CPU/GPU(s) 512 with a ranking below a predetermined ranking threshold associated with processing capacity.

Additionally and/or alternatively, the mapping may be performed based on a type of logical GPU created by virtual GPU manager 522 at step 612. For example, in instances in which the logical GPU created by virtual GPU manager 522 is of a single super-GPU model, each aspect of the graphical processing request may be mapped to the single super-GPU view. In instances in which the logical GPU created by virtual GPU manager 522 is of a multiple super-GPU model, each aspect of the graphical processing request may be mapped to each of the super-GPU views of the multiple super-GPU model. Alternatively, aspects of the graphical processing request requiring high processing capacity may be mapped by virtual GPU manager 522 to a first group of one or more of the super-GPU views of the multiple super-GPU model and aspects of the graphical processing request that do not require high processing capacity may be mapped by virtual GPU manager 522 to a second group of one or more of the super-GPU views of the multiple super-GPU model.

In instances in which the logical GPU created by virtual GPU manager 522 is of a multi-adapter model, the aspects of the graphical processing request requiring heavy-load processing capacity may be mapped by virtual GPU manager 522 a first logical grouping of one or more of the available physical GPUs with heavy-load processing capacity and aspects of the graphical processing request not requiring heavy-load processing capacity may be mapped to a second logical grouping of one or more of the available physical GPUs with light-load processing capacity. In other words, rendering operations of the graphical processing request may be mapped by the virtual GPU manager 522 to a first logical grouping of one or more of the available physical GPUs with heavy-load processing capacity and post-processing operations of the graphical processing request may be mapped by the virtual GPU manager 522 to a second logical grouping of one or more of the available physical GPUs with light-load processing capacity.

Figure 6E:
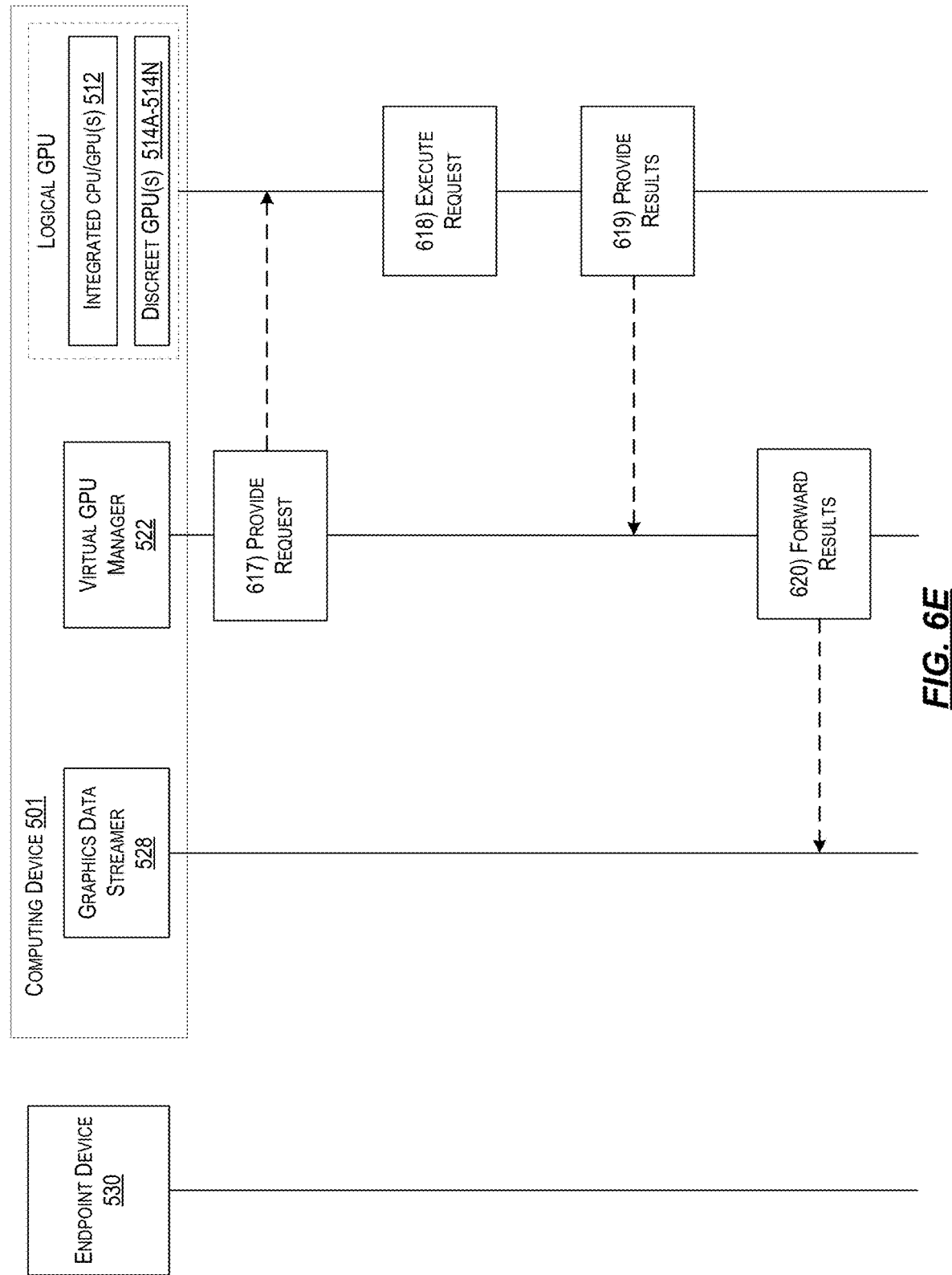

Referring to FIG. 6E, at step 617, virtual GPU manager 522 may provide the graphical processing request to the logical GPU by way of the virtual graphics driver(s) 526. The virtual graphics driver(s) 526 may control the distribution of the aspects of the processing request to the physical GPUs based on the mapping generated by virtual GPU manager 522 at step 616. The providing of the request may include commanding, by the virtual GPU manager 522 and/or the virtual graphics driver(s) 526 and by way of the logical GPU, each of the one or more of the discreet GPUs 514A-514N and/or integrated CPU/GPU(s) 512 of the logical view to perform the aspects of the graphical processing request.

At step 618, the physical GPUs corresponding to the logical GPU may execute each of the aspects of the graphical processing request. In some instances data generated during the execution of the graphical processing request may be stored in cross-shared memory heaps 518 by one or more of the logical GPU, the one or more of the discreet GPUs 514A-514N and/or integrated CPU/GPU(s) 512 of the logical GPU, virtual graphics driver(s) 526, and/or virtual GPU manager 522.

For example, in instances in which the logical GPU is generated by virtual GPU manager 522 in the multi-adapter model, a first logical grouping corresponding to heavy-load processing may execute graphics rendering operations of the graphical processing request upon command by one or more of the virtual GPU manager 522 and/or virtual graphics driver(s) 526. After execution of the rendering operations, the data generated may be stored in cross-shared memory heaps 518 by one or more of the first logical grouping, the one or more of the discreet GPUs 514A-514N and/or integrated CPU/GPU(s) 512 of the first logical grouping, virtual graphics driver(s) 526, and/or virtual GPU manager 522. Subsequently, a second logical grouping corresponding to light-load processing may execute post-processing operations of the graphical processing request based on the rendering operation data stored in shared heaps 518 upon command by one or more of the virtual GPU manager 522 and/or virtual graphics driver(s) 526.

At step 619, the results of the graphical processing request may be provided by the logical GPU and/or one or more of the discreet GPUs 514A-514N and/or integrated CPU/GPU(s) 512 to virtual GPU manager 522 and/or virtual graphics driver(s) 526. Additionally and/or alternatively, the results of the graphical processing request may be stored in cross-shared memory heaps 518 by the logical GPU and/or one or more of the discreet GPUs 514A-514N and/or integrated CPU/GPU(s) 512 and the data corresponding to the results may be accessible by virtual GPU manager 522 and/or virtual graphics driver(s) 526. At step 620, the virtual GPU manager 522 and/or virtual graphics driver(s) 526 may forward the results of the graphical processing request graphics data streamer 528. In some instances, the data corresponding to the results stored in cross-shared memory heaps 518 may be accessible by graphics data streamer 528.

Referring to FIG. 6F, at step 621, graphics data streamer 528 may format the results of the graphical rendering request in preparation for transmission. Formatting may include compression, encryption, format conversion, and the like. In some instances, the formatting may be performed by virtual GPU manager 522.

At step 622, graphics data streamer 528 may transmit the results to endpoint device 530. In instances in which computing device 501 is a user computing device and endpoint device 530 is a display device, the transmission of the results may further include a command for displaying the results of the rendering operation.

At step 623, graphics data streamer 528, through a communication interface of computing device 501, may identify network conditions related to the communicative connection with endpoint device 530. As stated above, the network conditions may include one or more of bandwidth availability and round-trip transmission rates. At step 624, graphics data streamer 528 may provide the network conditions data to virtual GPU manager 522.

Figure 6G:
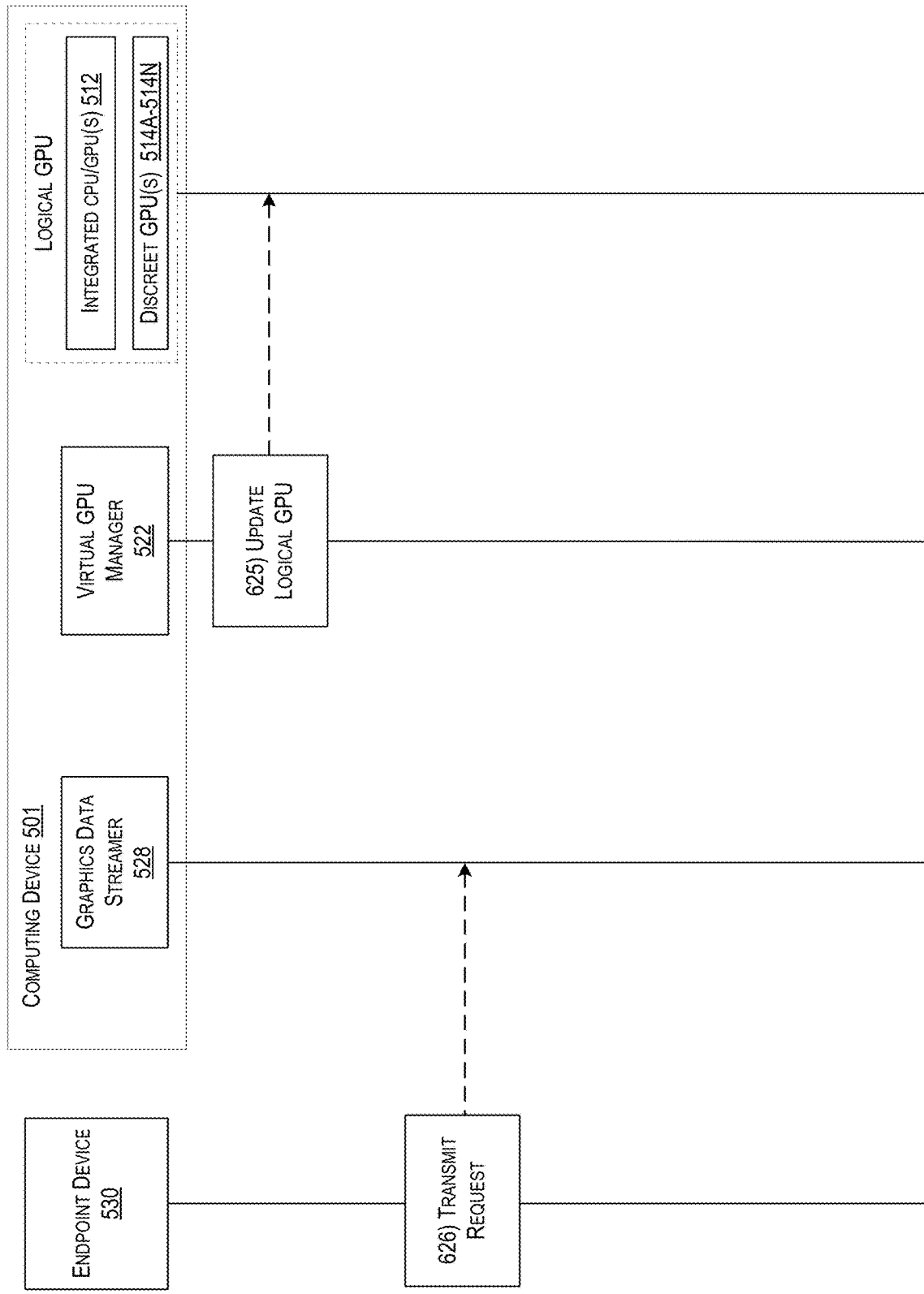

Referring to FIG. 6G, at step 625, virtual GPU manager 522 may update the logical GPU. In the event that the network conditions data indicates network congestion (e.g., low bandwidth availability, high round-trip transmission rates, etc.), virtual GPU manager 522 may decrease or increase the number of the one or more discreet GPUs 514A-514N and/or integrated CPU/GPU(s) 512 in the logical GPU. Similarly, in the event that the network conditions data indicates network availability (e.g., high bandwidth availability, low round-trip transmission rates, etc.), virtual GPU manager 522 may increase or decrease the number of the one or more discreet GPUs 514A-514N and/or integrated CPU/GPU(s) 512 in the logical GPU.

In regard to instances in which the logical GPU is generated in the super-GPU model, the virtual GPU manager 522 may increase or decrease the number of one or more discreet GPUs 514A-514N and/or integrated CPU/GPU(s) 512 in the super-GPU model based on network conditions data. For example, if the network conditions data indicates network congestion (e.g., low bandwidth availability, high round-trip transmission rates, etc.), virtual GPU manager 522 may decrease or increase the number of the one or more discreet GPUs 514A-514N and/or integrated CPU/GPU(s) 512 in the super-GPU. Similarly, if the network conditions data indicates network availability (e.g., high bandwidth availability, low round-trip transmission rates, etc.), virtual GPU manager 522 may increase or decrease the number of the one or more discreet GPUs 514A-514N and/or integrated CPU/GPU(s) 512 in the super-GPU model.

Additionally and/or alternatively, in arrangements in which a plurality of super-GPU views are generated by virtual GPU manager 522 in relation to the one or more discreet GPUs 514A-514N and/or integrated CPU/GPU(s) 512, virtual GPU manager 522 may be configured to dynamically reconfigure and/or reallocate the number of active physical GPUs in one or more of the plurality of super-GPU views based on network conditions. For example, if the network conditions data indicates network congestion (e.g., low bandwidth availability, high round-trip transmission rates, etc.), virtual GPU manager 522 may decrease or increase the number of the one or more discreet GPUs 514A-514N and/or integrated CPU/GPU(s) 512 in one or more of the plurality of super-GPU views, reallocate one or more of the discreet GPUs 514A-514N and/or integrated CPU/GPU(s) 512 between one or more of the plurality of super-GPU views, and/or delete/decommission one or more of the plurality of super-GPU views by removing the corresponding one or more discreet GPUs 514A-514N and/or integrated CPU/GPU(s) 512 from the logical linkage. Similarly, if the network conditions data indicates network availability (e.g., high bandwidth availability, low round-trip transmission rates, etc.), virtual GPU manager 522 may increase or decrease the number of the one or more discreet GPUs 514A-514N and/or integrated CPU/GPU(s) 512 in one or more of the plurality of super-GPU views, reallocate one or more of the discreet GPUs 514A-514N and/or integrated CPU/GPU(s) 512 between one or more of the plurality of super-GPU views, and/or onboard/commission one or more additional super-GPU views by adding one or more discreet GPUs 514A-514N and/or integrated CPU/GPU(s) 512 to the logical linkage.

In regard to instances in which the logical GPU is generated in the multi-adapter model, the virtual GPU manager 522 may increase or decrease the number of one or more discreet GPUs 514A-514N and/or integrated CPU/GPU(s) 512 in the logical groupings of the multi-adapter model based on network conditions data. For example, if the network conditions data indicates network congestion (e.g., low bandwidth availability, high round-trip transmission rates, etc.), virtual GPU manager 522 may decrease or increase the number of the one or more discreet GPUs 514A-514N and/or integrated CPU/GPU(s) 512 in one or more of logical groupings (e.g., first logical grouping, second logical grouping, and so on), reallocate one or more of the discreet GPUs 514A-514N and/or integrated CPU/GPU(s) 512 between one or more of the logical groupings, and/or delete/decommission one or more of the logical groupings by removing the corresponding one or more discreet GPUs 514A-514N and/or integrated CPU/GPU(s) 512 from the logical arrangement. Similarly, if the network conditions data indicates network availability (e.g., high bandwidth availability, low round-trip transmission rates, etc.), virtual GPU manager 522 may increase or decrease the number of the one or more discreet GPUs 514A-514N and/or integrated CPU/GPU(s) 512 in one or more of the plurality of logical groupings, reallocate one or more of the discreet GPUs 514A-514N and/or integrated CPU/GPU(s) 512 between one or more of the logical groupings, and/or onboard/commission one or more additional logical groupings by adding one or more discreet GPUs 514A-514N and/or integrated CPU/GPU(s) 512 to the logical arrangement.

At step 626, in instances in which computing device 501 is one or more server computers and endpoint device 530 is a user computing device, endpoint device 530 may transmit a graphical rendering request to computing device 501 and, in particular, to graphics data streamer 528 through the a communication interface of computing device 501. In instances in which computing device 501 is a user computing device and endpoint device 530 is a display device, step 626 may not be performed.

Subsequently, computing device 501 may process and execute the graphical rendering request in the manner described above in steps 615 through step 625. Such processes may be performed until all graphics processing requests are completed.

Figure 7:
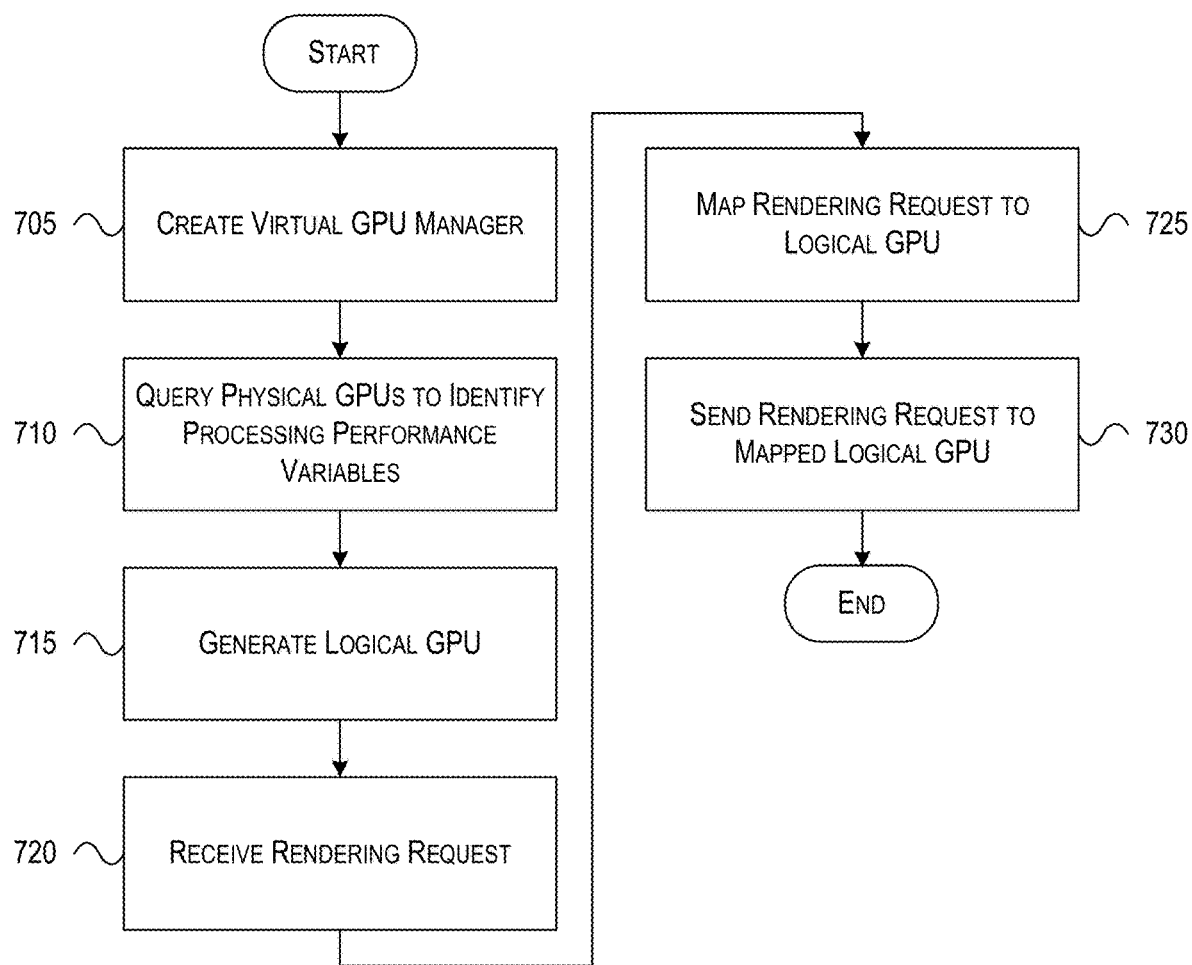
FIG. 7 depicts an illustrative method for performing graphical requests through multiple graphics processors according to one or more illustrative aspects of the disclosure.

FIG. 7 depicts an illustrative method for performing graphical requests through multiple graphics processors according to one or more illustrative aspects of the disclosure. Referring to FIG. 7, at step 705, a computing device having a plurality of physical GPUs, at least one processor, and memory, may create a virtual GPU manager. At step 710, virtual GPU manager may query each of the plurality of physical GPUs to identify processing performance variables of each of the plurality of physical GPUs. At step 715, the virtual GPU manager may generate a logical GPU corresponding to one or more of the plurality of physical GPUs. At step 720, the virtual GPU manager may receive a rendering request. At step 725, the virtual GPU manager may map the rendering request to the logical GPU based on the processing performance variables of the one or more of the plurality of physical GPUs. At step 730, the virtual GPU may send the rendering request to the mapped logical GPU.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method for distributing graphical processing unit (GPU) processing, comprising:
   querying, by a first computing device, a plurality of physical GPUs to identify processing performance variables of the plurality of physical GPUs;
   generating, by the first computing device and based on one or more of the processing performance variables of the plurality of physical GPUs, a logical GPU comprising a logical linkage between a first quantity of physical GPUs from the plurality of physical GPUs;
   receiving, by the first computing device and from a second computing device, a rendering request;
   mapping, by the first computing device, the rendering request to the logical GPU based on the processing performance variables of the two or more of the plurality of physical GPUs;
   sending, by the first computing device, the rendering request to the mapped logical GPU;
   receiving, by the first computing device, an indication of a change to network flow rates associated with network connectivity between the first computing device and the second computing device; and
   reconfiguring, by the first computing device and based on the indication of the change to the network flow rates, the logical GPU to comprise a logical linkage between a second quantity of physical GPUs.

2. The method for distributing GPU processing of claim 1, wherein the querying includes identifying a processing capacity for each of the plurality of physical GPUs, and wherein the method further comprises:
   enumerating, by the first computing device, each of the plurality of physical GPUs to identify a number of available physical GPUs;
   classifying, by the first computing device, each of the available physical GPUs based on the processing capacity of each of the available physical GPUs; and
   responsive to classifying each of the available physical GPUs, ranking, by the first computing device, each of the available physical GPUs based on the processing capacity, and
   wherein the mapping of the rendering request to the logical GPU is based on the classification of the available physical GPUs.

3. The method for distributing GPU processing of claim 1, wherein the logical linkage between the first quantity of physical GPUs appears as a single graphical processing object.

4. The method for distributing GPU processing of claim 1, wherein the logical GPU includes a first logical grouping and a second logical grouping each comprising a logical arrangement of the first quantity of physical GPUs.

5. The method for distributing GPU processing of claim 4, wherein the first logical grouping includes one or more physical GPUs classified with a heavy-load processing capacity and the second logical grouping includes one or more physical GPUs classified with a light-load processing capacity and wherein the first logical grouping and second logical grouping share a common memory allocation.

6. The method for distributing GPU processing of claim 5, wherein sending the rendering request to the mapped logical GPU includes:
   commanding, by the first computing device, the first logical grouping to perform one or more rendering operations associated with the rendering request;
   storing, by the first computing device, data produced by the first logical grouping in performing the one or more rendering operations in the common memory allocation; and
   commanding, by the first computing device, the second logical grouping to perform one or more post-processing operations of the data stored in the common memory allocation.

7. The method for distributing GPU processing of claim 5, further comprising:
   reallocating, by the first computing device, one or more physical GPUs between the first logical grouping and the second logical grouping of the logical GPU.

8. A computing device, comprising:
   a plurality of physical graphical processing units (GPUs);
   at least one processor;
   memory storing computer-readable instructions that, when executed by the at least one processor, cause the computing device to:
   query, by the computing device, the plurality of physical GPUs to identify processing performance variables of the plurality of physical GPUs;
   generate, by the computing device and based on one or more of the processing performance variables of the plurality of physical GPUs, a logical GPU comprising a logical linkage between a first quantity of physical GPUs from the plurality of physical GPUs;

receive, by the computing device and from a second computing device, a rendering request;

map, by the computing device, the rendering request to the logical GPU based on the processing performance variables of the two or more of the plurality of physical GPUs;

send, by the computing device, the rendering request to the mapped logical GPU;

receive, by the computing device, an indication of a change to network flow rates associated with network connectivity between the computing device and the second computing device; and reconfigure, by the computing device and based on the indication of the change to the network flow rates, the logical GPU to comprise a logical linkage between a second quantity of physical GPUs.

9. The computing device of claim 8, wherein the querying includes identifying a processing capacity for each of the plurality of physical GPUs, and wherein the memory stores further computer-readable instructions that, when executed by the at least one processor, cause the computing device to enumerate, by the computing device, each of the plurality of physical GPUs to identify a number of available physical GPUs;

classify, by the computing device, each of the available physical GPUs based on the processing capacity of each of the available physical GPUs; and responsive to classifying each of the plurality of physical GPUs, rank, by the computing device, each of the available physical GPUs based on the processing capacity, and wherein the mapping of the rendering request to the logical GPU is based on the classification of the available physical GPUs.

10. The computing device of claim 8, wherein the logical linkage between the first quantity of physical GPUs appears as a single graphical processing object.

11. The computing device of claim 8, wherein the logical GPU includes a first logical grouping and a second logical grouping each comprising a logical arrangement of the first quantity of physical GPUs.

12. The computing device of claim 11, wherein the first logical grouping includes one or more physical GPUs classified with a heavy-load processing capacity and the second logical grouping includes one or more physical GPUs classified with a light-load processing capacity and wherein the first logical grouping and second logical grouping share a common memory allocation.

13. The computing device of claim 12, wherein sending the rendering request to the mapped logical GPU includes:

command, by the computing device, the first logical grouping to perform one or more rendering operations associated with the rendering request;

store, by the computing device, data produced by the first logical grouping in performing the one or more rendering operations in the common memory allocation; and command, by the computing device, the second logical grouping to perform one or more post-processing operations of the data stored in the common memory allocation.

14. The computing device of claim 12, further comprising:

reallocate, by the computing device, an one or more physical GPUs between the first logical grouping and the second logical grouping of the logical GPU.

15. One or more non-transitory computer-readable media storing instructions that, when executed by a computing device comprising a plurality of physical graphical processing units (GPUs), at least one processor, and memory, cause the computing device to:

query, by the computing device, each of the plurality of physical GPUs to identify processing performance variables of each of the plurality of physical GPUs;

generate, by the computing device and based on one or more of the processing performance variables of the plurality of physical GPUs, a logical GPU comprising a logical linkage between a first quantity of physical GPUs from the plurality of physical GPUs;

receive, by the computing device and from a second computing device, a rendering request;

map, by the computing device, the rendering request to the logical GPU based on the processing performance variables of the two or more of the plurality of physical GPUs;

send, by the computing device, the rendering request to the mapped logical GPU;

receive, by the computing device, an indication of a change to network flow rates associated with network connectivity between the computing device and the second computing device; and reconfigure, by the computing device and based on the indication of the change to the network flow rates, the logical GPU to comprise a logical linkage between a second quantity of physical GPUs.

16. The one or more non-transitory computer-readable media of claim 15, wherein the querying includes identifying a processing capacity for each of the plurality of physical GPUs, and wherein the one or more non-transitory computer-readable media store further instructions that, when executed by the computing device comprising the plurality of graphical processing units (GPUs), at least one processor, and memory, cause the computing device to:

enumerate, by the computing device, each of the plurality of physical GPUs to identify a number of available physical GPUs;

classify, by the computing device, each of the available physical GPUs based on the processing capacity of each of the available physical GPUs; and responsive to classifying each of the plurality of physical GPUs, rank, by the computing device, each of the available physical GPUs based on the processing capacity, and wherein the mapping of the rendering request to the logical GPU is based on the classification of the available physical GPUs.

17. The one or more non-transitory computer-readable media of claim 15, wherein the logical linkage between the first quantity physical GPUs appears as a single graphical processing object.

18. The one or more non-transitory computer-readable media of claim 17, wherein the logical GPU includes a first logical grouping and a second logical grouping each comprising a logical arrangement of the first quantity of physical GPUs.

19. The one or more non-transitory computer-readable media of claim 18, wherein the first logical grouping includes one or more physical GPUs classified with a heavy-load processing capacity and the second logical grouping includes one or more physical GPUs classified with a light-load processing capacity and wherein the first logical grouping and second logical grouping share a common memory allocation.

20. The one or more non-transitory computer-readable media of claim 19 storing further instructions that, when executed by the computing device comprising the plurality of graphical processing units (GPUs), at least one processor, and memory, cause the computing device to:
- command, by the computing device, the first logical grouping to perform one or more rendering operations associated with the rendering request;
- store, by the computing device, data produced by the first logical grouping in performing the one or more rendering operations in the common memory allocation; and
- command, by the computing device, the second logical grouping to perform one or more post-processing operations of the data stored in the common memory allocation.

* * * * *